United States Patent [19]
Rebman

[11] Patent Number: 4,765,795
[45] Date of Patent: Aug. 23, 1988

[54] OBJECT MANIPULATOR

[75] Inventor: Jack Rebman, Cary, N.C.

[73] Assignee: Lord Corporation, Erie, Pa.

[21] Appl. No.: 872,493

[22] Filed: Jun. 10, 1986

[51] Int. Cl.[4] .......................... B66C 23/00; B66F 9/00
[52] U.S. Cl. .................................... 414/680; 901/14; 901/21
[58] Field of Search ....................... 901/14, 19, 21, 27, 901/50, 15; 74/479; 52/646, 648; 464/51, 86, 92, 147, 179; 414/730, 680

[56] References Cited

U.S. PATENT DOCUMENTS

| | | | |
|---|---|---|---|
| 1,001,603 | 8/1911 | Aschauer et al. | 52/648 X |
| 2,027,386 | 1/1936 | Krummer | 52/646 X |
| 2,924,082 | 2/1960 | Reich | 464/92 X |
| 3,060,972 | 10/1962 | Sheldon | 138/120 |
| 3,227,290 | 1/1966 | Lemelson | 414/735 |
| 3,284,964 | 11/1966 | Saito | 52/2 |
| 3,497,083 | 2/1970 | Anderson et al. | 414/738 |
| 3,864,983 | 2/1975 | Jacobsen | 901/27 X |
| 4,107,948 | 1/1977 | Molaug | 464/148 |
| 4,176,522 | 12/1979 | Holtzapple et al. | 464/86 X |
| 4,300,362 | 11/1981 | Lande et al. | 464/117 |
| 4,393,728 | 7/1983 | Larson et al. | 74/469 |
| 4,489,826 | 12/1984 | Dubson | 198/812 |
| 4,494,417 | 1/1985 | Larson et al. | 74/469 |
| 4,551,061 | 11/1985 | Olenick | 414/735 |
| 4,557,097 | 12/1985 | Makulas et al. | 52/646 |
| 4,621,965 | 11/1986 | Wilcock | 901/14 X |

FOREIGN PATENT DOCUMENTS

| | | | |
|---|---|---|---|
| 112099 | 6/1984 | European Pat. Off. | 901/15 X |
| WO84/00125 | 1/1984 | World Int. Prop. O. | |
| 2083795 | 3/1982 | United Kingdom | 901/14 X |
| 676441 | 7/1979 | U.S.S.R. | |
| 1007959 | 3/1983 | U.S.S.R. | 901/14 X |
| 1222538 | 4/1986 | U.S.S.R. | 901/14 X |

Primary Examiner—Robert J. Spar
Assistant Examiner—Jennifer L. Doyle
Attorney, Agent, or Firm—Bell, Seltzer, Park & Gibson

[57] ABSTRACT

An elongate main body section of the manipulator has its opposite ends respectively connected to a base section and an object support section. The main body section consists of elongate flexible rod members extending in generally parallel spaced relationship to each other and to the central axis of such section. The lower end portions of the rods are driven by drive mechanisms within the base section to selectively cause the main body section to undergo extension/retraction, bending and/or twisting movement in desired directions. The rod members may be resiliently flexible throughout their entire extent, or may be comprised of rigid sections interconnected by elastomeric joints. In one embodiment the drive mechanisms imparts rotation to the lower end portion of each rod member to produce twisting of the main body section, while in another embodiment axial movement imparted to the rods is reacted by an object support section having relatively moveable components to produce the twisting movement.

18 Claims, 3 Drawing Sheets

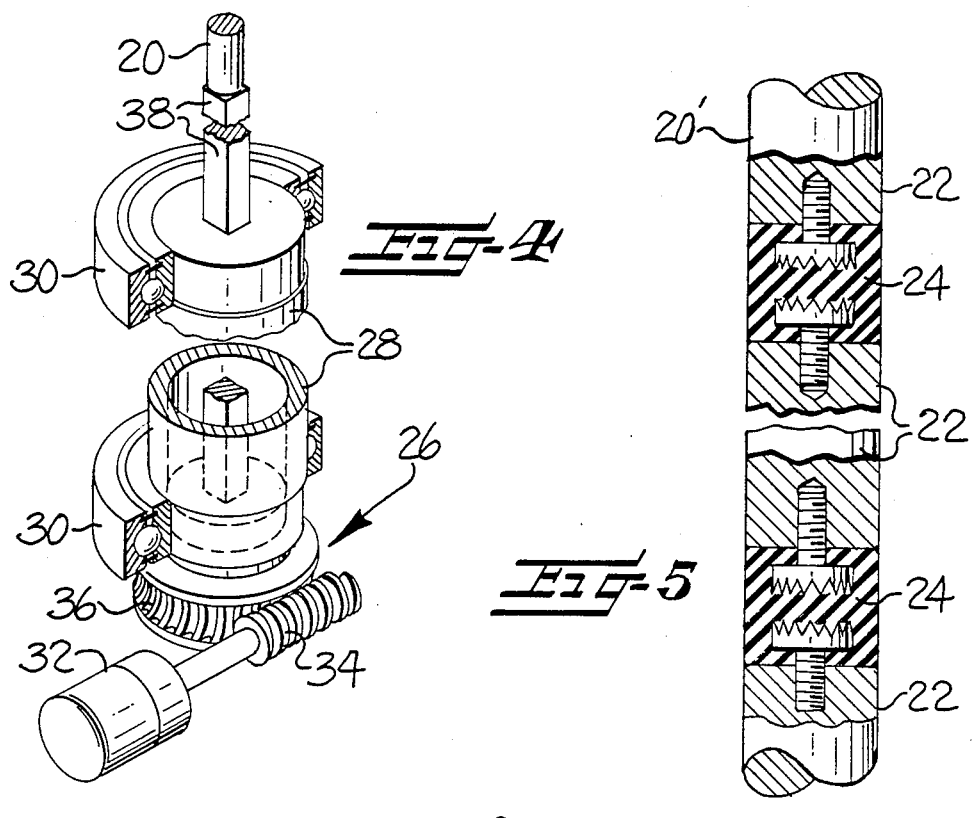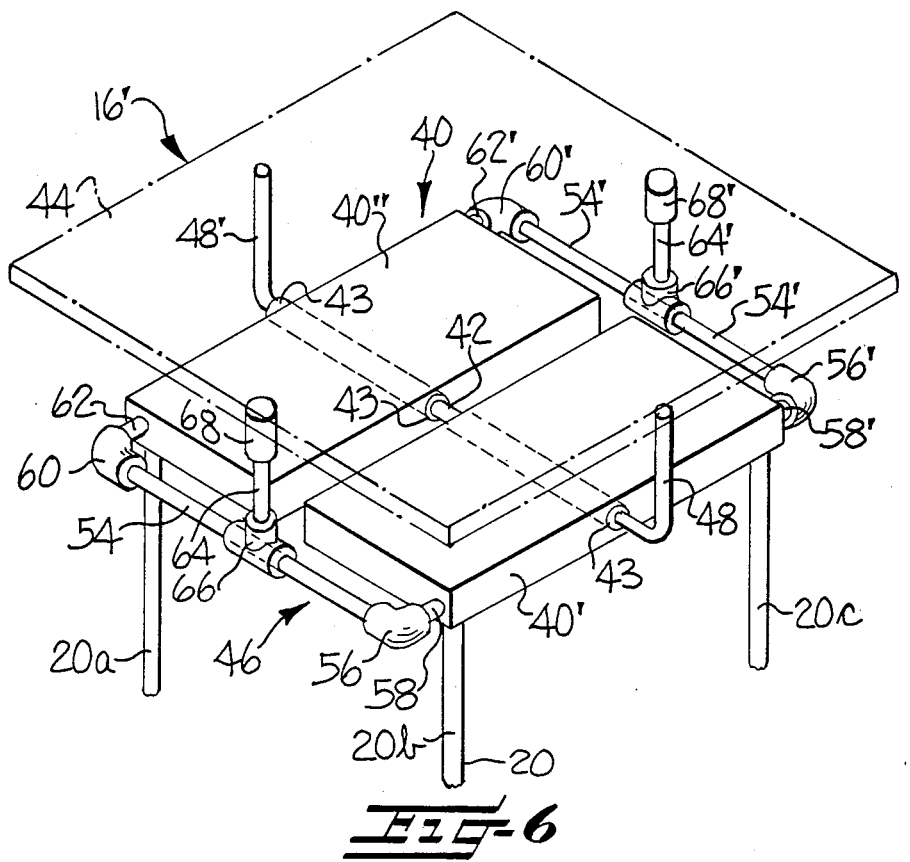

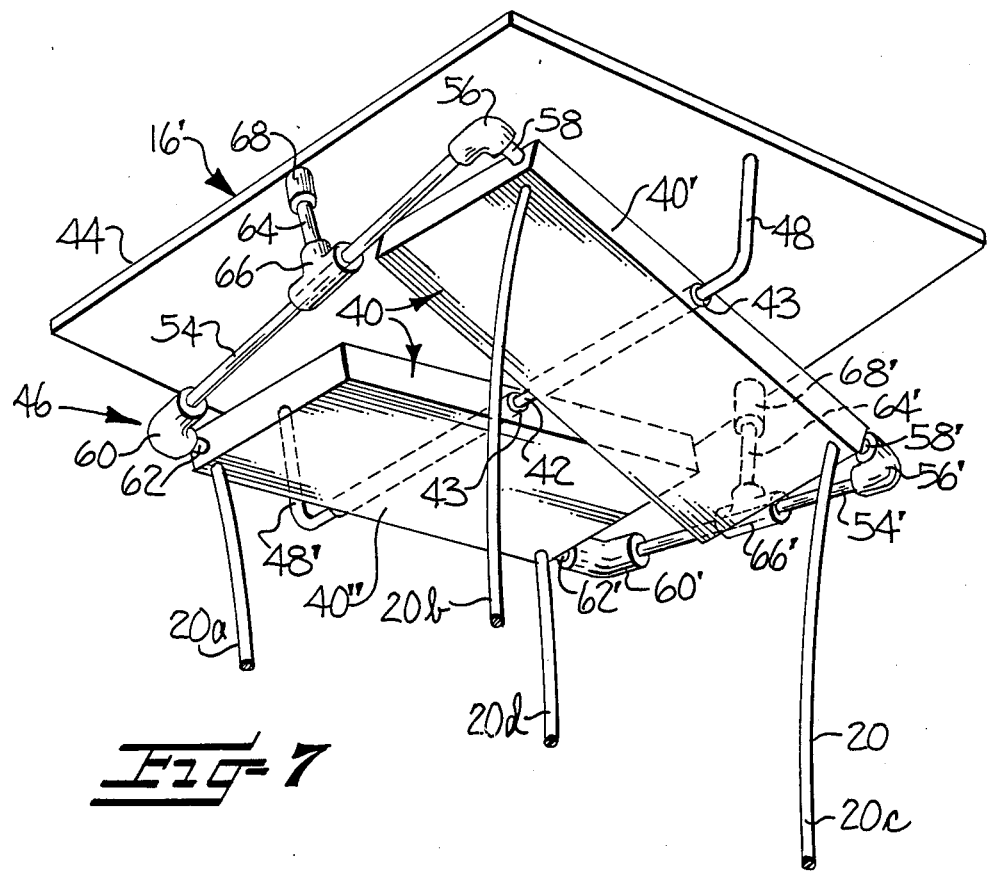
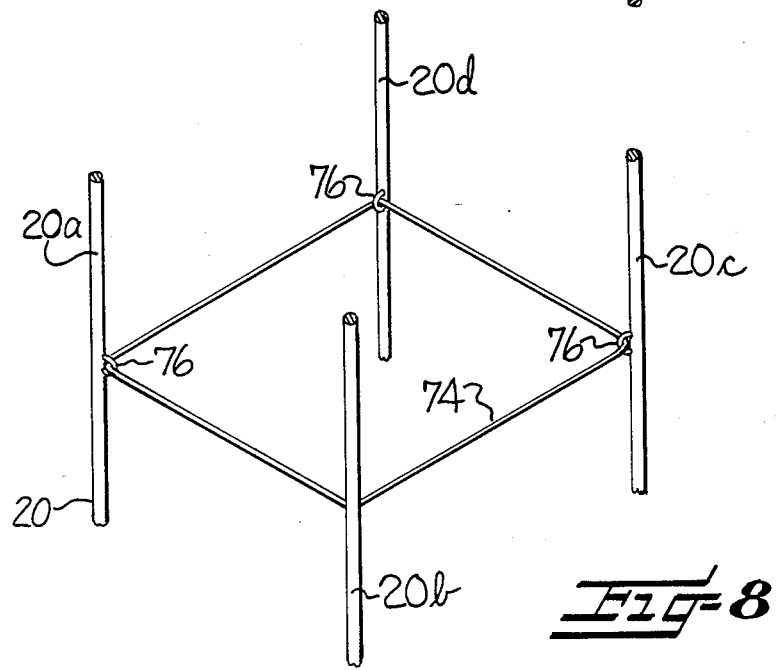

OBJECT MANIPULATOR

This invention relates to remotely controllable object manipulators of the type capable of multi-directional bending and, in some instances, other movement. Manipulators of the aforesaid type may be advantageously employed as, among other things, dextrous "arm" or "finger" components of industrial robots.

BACKGROUND OF THE INVENTION

The increasing use of robotic devices has created a need for highly versatile object manipulators that are suitable or readily adaptable for use in diverse applications, environments and technologies. One indicia of the versatility of an object manipulator is the number and types of motion of which it is capable. A manipulator capable of only bending and/or axial movement is significantly less versatile than one also capable of twisting or rotational movement. Another indicia of versatility is the cost of manufacturing, servicing and using the manipulator. If the cost of a manipulator is excessive in any of the foregoing respects, its use will be restricted. The cost of a manipulator will usually be directly proportional to the number of its component parts and the complexity of its design. Design simplification and minimization of the number of components parts is therefore highly desirable. The use of components that perform multiple functions contributes to the foregoing result. By way of example, the components that provide structural shape and integrity to the manipulator preferably should also be usable for transmission of the forces causing its bending and other desired movements. Further benefits are obtained if the force transmitting capability of the components is a multi-directional one as opposed to being only uni-directional as is the case with the cables, cords, "tendons" and similar tension-type force transmitting components used in many object manipulators. Another desirable design feature, which also is not present in manipulators having actuators of the aforesaid tension type, is the capability for automatic restorative or "return" movement of the manipulator back to or at least toward some predetermined nominal position following cessation of the forces causing bending or other distortive movement of it.

DESCRIPTION OF THE PRIOR ART

U.S. Pat. No. 4,489,826 discloses an object manipulator capable of extension, retraction and multi-directional bending. Such movements are produced by extension and/or retraction of rigid rod elements extending from the manipulator's base section, which contains drive means connected to the rods. The rods serve as supports, as well as force transmitters, and have metallic universal-type joints associated therewith for connecting them to similar rods of another manipulator unit or to an object support member.

Other U.S. patents of possible relevance to the present invention are: Nos. 3,060,972, 3,227,290, 3,497,083, 4,393,728, 4,494,417 and 4,551,061. The object manipulators of the foregoing patents are capable of multi-directional bending. While most of them utilize cables or similar tension-type actuating elements, some also have passive self-sustaining flexure elements associated therewith: see, e.g., elements 108 of 3,060,972. The pneumatically actuated manipulator of U.S. Pat. No. 4,551,061 also includes passive flexure elements, designated by the numerals 61, 63 and 65, which undergo relative axial displacement during bending of the manipulator.

SUMMARY OF THE INVENTION

The present invention provides an object manipulator, suitable for use as a robot "arm" or the like, that is highly versatile and efficient in both its operation and its design. Each manipulator unit is capable of multi-directional bending movement, of extension and retraction along a central axis, and also of twisting movement about such axis. The main body section of the manipulator unit consists of a plurality of elongate self-sustaining flexure members that extend in laterally spaced and generally parallel relationship to a central axis and each other, between base and object support sections of the manipulator. Drive means associated with the base section of the unit drivably engages the adjacent end portions of the flexure members and selectively imparts movements to them, causing the desired bending, extension, retraction and/or twisting of the central section of the unit. In one embodiment of the invention, the drive means rotates the adjacent end portions of the flexure members about their respective central axes to effect twisting movement of the main body section of the unit. In another embodiment twisting movement ensues when the drive means axially displaces certain of the flexure members relative to other of them. In the latter embodiment the object support section of the manipulator includes a member having portions that pivot relative to each other in response to forces imposed thereon by the axial movements of the flexure members. The pivoting member preferably supports another member that maintains a stable orientation during relative pivotal movement of the sections of the first member.

The flexure members of the manipulator may be resiliently flexible throughout their lengths and formed entirely of spring steel or similar material. Alternatively, the flexure elements may be formed of substatially rigid sections interconnected by flexible force-transmitting joints of the type containing resilient elastomeric material. When the flexure members are of either of the foregoing constructions, the main body section of the manipulator will tend to automatically return to a nominal "rest" position when free to do so.

DESCRIPTION OF THE DRAWINGS

Other features of the invention will be apparent from the following description of illustrative embodiments thereof, which should be read in conjunction with the accompanying drawing, in which:

FIG. 4 is a somewhat schematic foreshortened view, partially in section and partially in elevation, of drive means associated with the base section and with each elongate flexure member of a manipulator unit;

FIG. 5 is a fragmentary and foreshortened side elevational view of an alternative type of unit flexure member;

FIG. 6 is a top perspective view of an alternative construction of the object support section and adjacent components of a manipulator unit, one component being shown by phantom lines;

FIG. 7 is a bottom perspective view showing the FIG. 6 components in positions assumable by them in response to relative extension/retraction of selected ones of the elongate flexure members of the unit; and FIG. 8 is a fragmentary perspective view of an alternate embodiment in which the unit flexure members are innerconnected intermediate their length by elastic means.

DESCRIPTION OF THE PREFERRED EMBODIMENTS

Figure 1:
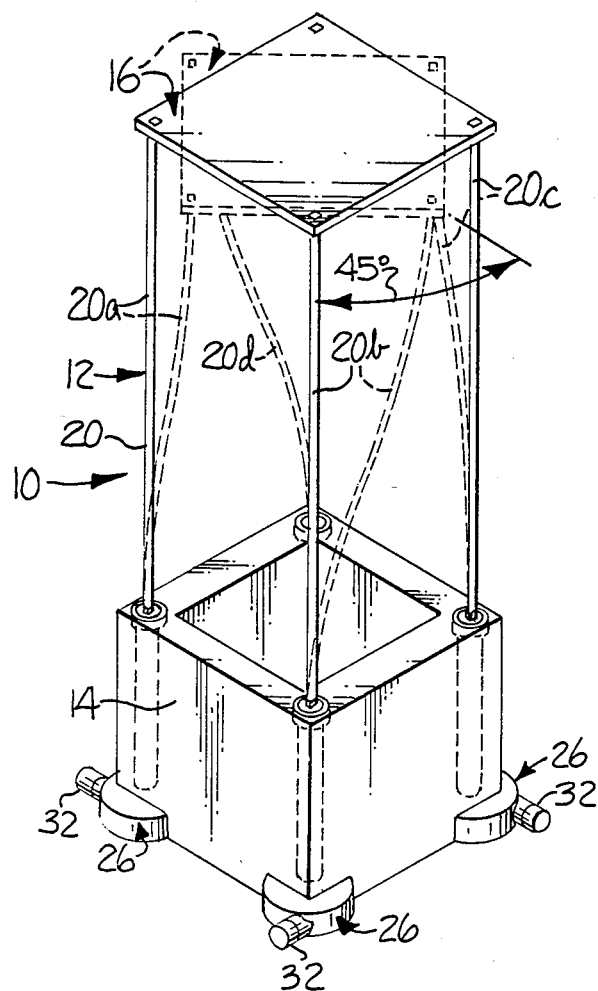
FIG. 1 is a perspective view of a manipulator unit in accordance with the invention, the capability of its main body section unit for twisting about a central axis being illustrated by phantom lines.
Figure 2:
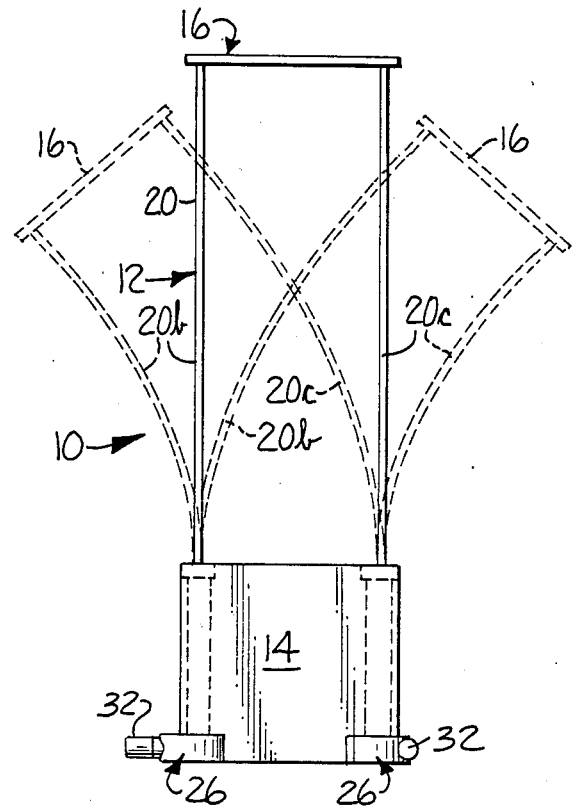
FIG. 2 is a side elevational view of the unit, wherein the capability for bending movement is indicated by phantom lines.
Figure 3:
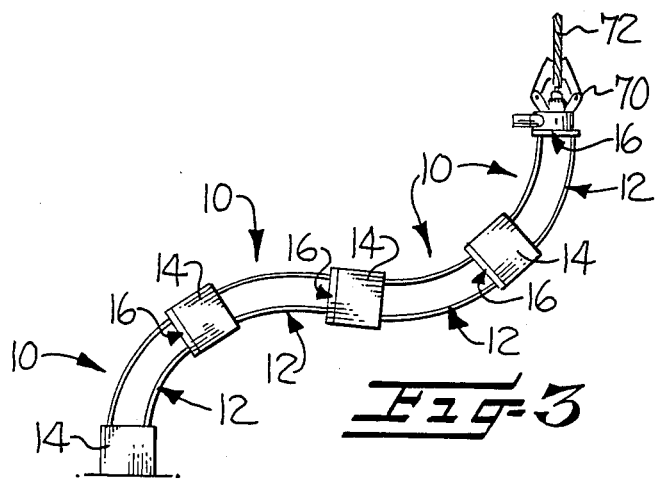
FIG. 3 is a schematic representation of a manipulator apparatus comprised of an array of serially interconnected manipulator units, and of an object supported by the terminal unit.

The numeral 10 is FIGS. 1 and 2 of the drawings designates an object manipulator unit having means defining an elongate flexible main body section 12 interconnecting a base section 14, disposed adjacent the lower end of section 12 in the illustrative vertical orientation of unit 10, and an object support section 16 disposed adjacent and fixedly connected to the opposite outer or upper end of section 12. Section 16 of unit 10 is adapted to receive and support, in any suitable manner, the object that is to be remotely positioned or manipulated by the unit. The object may be of any desired type, such as a tool, a part to be assembled with another part, a surgical instrument or, as is indicated in FIG. 3 of the drawings, another manipulator unit 10. Manipulation of section 16 of unit 10, and of whatever object might be supported upon such section, results from controlled movement undergone by the unit's main section 12 in response to inputs from drive means 26 associated with base section 14 of the unit. The movements of which section 12 is capable include extension and retraction along its central longitudinal axis, twisting movement about such axis (indicated by phantom lines in FIG. 1) and multi-directional lateral bending movement (indicated by phantom lines in FIG. 2). Extension and/or retraction of section 12 of unit 10 produces translatory movement of object support section 16 along the central axis of section 12. Twisting of section 12 produces rotation of object support section 16 about the central axis of section 12. Bending of section 12 produces lateral displacement and tilting of object support section 16.

Body section 12 of unit 10 is comprised essentially of a plurality of elongate rod-like flexure members 20 that normally extend in generally parallel relationship to each other and to the central longitudinal axis of unit 10 at substantially equally spaced locations about such axis. While there are four such rods 20 in the illustrated unit 10, a greater number might be employed. As few as three could be used without unduly limiting the motion capabilities of the unit, and some of those capabilities could be realized with only two rods. The upper end portions of rods 20 are fixedly secured to support section 16 of unit 10, at spaced locations adjacent its periphery. In the case of the generally rectangularly shaped support section 16 shown in FIGS. 1 and 2, the upper end portions of rods 20 are disposed adjacent its respective corner areas. Although generally parallel, rods 20 may and preferably do converge slightly toward each other and the central axis of section 16 of unit 10, from their lower end portions to their upper end portions. Rods 20 are so constructed as to be capable of substantial bending and/or twisting strain without permanent deformation, while at the same time being resistent to such excessive bending as would impair their ability to axially transmit compressive forces and/or motions. Rods 20 may be formed, as shown in FIGS. 1 and 22, completely of spring steel or similar material, in which case they will possess the desired resilience and flexibility throughout their entire length. Alternatively, the rods may be of the construction of the rod 20' fragmentarily shown in FIG. 5 and consisting of rigid sections 2 interconnected by resilient elastomeric-type joints 24. Such joints are capable of multi-directional force and torque transmission and bending movement, and tend to return automatically to their illustrated straight conditions under "no-load" conditions. The construction of rods 20' (FIG. 5) provides greater force transmitting capacity without limiting motion capability, but would normally be somewhat more expensive than the construction of rods 20 (FIGS. 1 and 2).

The drive means carried by base section 14 of unit illustratively comprises four drive assemblies 26 associated with the lower or inner end portions of respective ones of the four rods 20. Each assembly is identical to that shown in FIG. 4. Such assembly includes a fluid-powered piston and cylinder unit whose upstanding cylinder element 28 is mounted within base section 14 (FIGS. 1 and 2) by bearings 30 for rotative movement about the cylinder's central axis. Such movement is imparted at desired times to cylinder 28 by a motor/clutch unit 32 having an output gear 34 meshing with a gear 36 encircling and affixed to the lower end of the cylinder. The rod element 38 of the piston and cylinder unit has a noncircular shape or is otherwise suitably constrained so as to rotate in unison with cylinder 28. The upper end of rod element 38 is fixedly secured in any suitable manner to the lower end of the therewith associated flexure rod 20 of manipulator body section 12. The rods 38 of each of the remaining three drive assemblies 26 are similarly affixed to the therewith associated ones of the remaining three flexure rods 20 of main body section 12 of unit 10.

Suitable control circuitry and devices (not shown), which may include a digital computer or the like, control and coordinate the operation of drive assemblies 26 to cause main body section 12 of unit 10 to undergo movements of the desired types and extents. To effect extension or retraction of main body section 12, with resulting "upward" or "downward" axial translatory movement of object support section 16, the rods 38 of all four drive assemblies 26 are caused to undergo simultaneous and equal extension or retraction. Leftward bending movement of main body section 12, such as illustrated in FIG. 2, ensues when drive assemblies 26 effect retraction of flexure rods 20a, 20b relative to the remaining flexure rods 20c, 20d, and/or effect extension of rods 20c, 20d relative to rods 20a, 20b. Bending movement of section 12 in other lateral directions is similarly realized by retraction or extension of certain of the rods 20 relative to the remaining rods. Twisting movement of body section 12, illustrated by phantom lines in FIG. 1 of the drawings, ensues when drive assemblies 26 are caused to rotate the thereto connected lower end portions of rods 20 in the same clockwise or counterclockwise direction about their longitudinal axes. Since the upper end portions of rods 20 are fixed to object support section 16, and are not free to rotate relative to it, the foregoing causes rotation of section 16 and twisting of section 12 about the central longitudinal axis of section 12. While FIG. 1 illustrates counterclockwise rotation of object support section 16 through an angle of approximately 45°, the direction and extent (within, of course, maximum limits) of rotation are dependent upon the direction and extent of the rotation imparted to the lower end portions of rods 20 by drive assemblies 26.

Object support section 16 of unit 10 would similarly tend to undergo rotative movement, such as described above, if two of the rod elements 20 at diagonally opposite corner areas of section 16 were simultaneously extended and the remaining two rod elements 20 were either simultaneously retracted or were not driven at all. However, significant actual rotative movement of section 16 in response to the forces imposed thereon in the foregoing manner would transpire only if significant relative movement could occur between different portions of section 16, and also only if the lower end portions of rods 20 were free to rotate about their respective longitudinal axes. The later condition can be readily met simply by either eliminating the rotation-producing components 32, 34, 36 of drive assemblies 26 (FIG. 4) or by disengagement of the clutches of components 32. The former condition may be satisfied by the provision in unit 10 of an object support means 16' of the alternative construction shown in FIGS. 6 and 7. Support 16' includes a platform 40 having two sections 40', 40" that are pivotably movable relative to each other about the axis of an elongate shaft or bearing 42 extending transversely through the sections and maintained in association therewith by collar elements 43. Two of the rods 20 of manipulator 10, illustratively rods 20b and 20c, have their upper ends affixed to corner areas of platform section 40' while the remaining two rods 20a, 20d are affixed to corner areas of the other platform section 40". As indicated in FIG. 7, simultaneous extension of two diagonally opposite ones of the flexure rods 20 (illustratively rods 20b, 20d) and retraction of the remaining two diagonally opposite rods (illustratively 20a, 20c) tilts platform sections 40', 40" in opposite directions about the axis of connecting shaft 42, and produces a moment tending to rotate platform 16' about the central axis of unit 10. Such moment produces actual rotation of platform 40 when the lower end portions of rods 20 are permitted, either in ways previously described or in any other suitable manner, to rotate about their respective central axes.

The use of a platform 40 having relatively movable sections permits the achievement of rotative movement of the platform and twisting movement of body section 12 of unit 10 by a simplified drive means, which need impart only axial movement to flexure rods 20. However, the unstable nature of the pivoting sections 40', 40" of platform 40 may render it unsuitable for mounting many types of objects. To overcome the foregoing disadvantage, support section 16' of unit 10 preferably is further provided with a second platform 44 that overlies platform 40, and is so connected to it as to remain stable while undergoing rotative movement in unison with platform 40 about the axis of body section 12.

The means innerconnecting platforms 40, 44 includes flexible frame means 46, and a pair of rigid extensions 48, 48' that extend upwardly from opposite ends of shaft 42 and are fixedly connected to the undersurface of platform 44. Frame 46 supplements the stable supportive connection provided by elements 48, 48'. It includes a rigid link 54 having one end connected by an elastomeric bearing 56 to a rigid link 58 affixed to an end of section 40' of lower platform 40, and having its opposite end connected by an elastomeric bearing 60 to a rigid link 62 fixed to the corresponding end of section 40" of platform 40. An upstanding rigid link 64 has its lower end portion connected by elastomeric bearing 66 to the center of link 54, and has its upper end portion connected by an elastomeric bearing 68 to upper platform 44 at a location adjacent one end of a platform center line extending normal to a vertical plane containing the axis of shaft 42. Identical link and bearing components, designated in the drawings by the same reference numerals with the addition of a prime designation, similarly interconnect the opposite ends of lower platform sections 40', 40" with upper platform 44.

As is indicated in FIG. 7, oppositely directed rotative movement of sections 40', 40" of platform 40 about shaft 42 tilts rigid links 54, 54' relative to the vertical. Elastomeric bearings 66, 68 and 66', 68' permit such tilting movement to occur without destabilization of platform 44 while providing, in association with other components of the flexible frame, vertical support for the platform ends. Such bearings also assist shaft extensions 48, 48' in causing rotative movement of upper platform 44 in unison with lower platform 40.

FIG. 3 shows, in schematic form, a sinuous array of four serially connected units 10. The units are independently but cooperatively driven. The base of all but the first or lowermost unit is affixed to the object support section of the preceeding unit, and the object supporting section of the final unit carries a gripper 70 holding an article or tool 72. It will be appreciated that a greater or lesser number of units 10 might be employed in a similar array, and that the same might be caused to assume an almost limitless number of sinuous or other configurations and orientations due to each unit's capability for twisting movement in addition to bending and extension/retraction.

FIG. 8 shows a resiliently flexible type of interconnection that may optionally be provided between flexure rods 20 of unit 10 intermediate the length of such rods. The connection illustratively consists of an elastically constrictive cable 74 that extends through and between eyelets 76 upon rods 20. When provided, such interconnection assists in maintaining rods 20 in substantially parallel relationship to each other during bending thereof under substantial loads, and therefore enhances the ability of unit 10 to sustain such loads without buckling of the rods. Cable 74 is of course sufficiently flexible as to not impede relative movement of rods 20 along or about their longitudinal axes.

While preferred embodiments of the invention have been specifically shown and described, this was for purposes of illustration only, and not for purposes of limitation, the scope of the invention being in accordance with the following claims.

I claim:

1. An object manipulator for selectively positioning an object, comprising:
   base means;
   object support means for supporting the object to be positioned;
   elongate flexible main body means connected adjacent one end thereof to said base means and adjacent its opposite end to said support means for undergoing selected multidirectional bending and twisting movements effective to vary the position of said support means relative to said base means;
   said elongate body means having a longitudinal axis and including at least three resilient flexure members spaced from and about said axis and extending in generally parallel relationship thereto; and drive means connected to said flexure members for imparting thereto motions causing said multidirectional bending and twisting movements of said elongate body means, said drive means including means for applying axial compressive-type forces of substantial magnitude upon said flexure members, said flexure members being rods adapted for and capable of transmission of said compressive forces from said one end to said other end thereof.

2. A manipulator as in claim 1, wherein said drive means is located and connected to said flexure members adjacent said base means.

3. A manipulator as in claim 2, wherein said drive means includes a piston and cylinder assembly.

4. A manipulator as in claim 1, wherein there are four of said flexure elements spaced at intervals of approximately 90° about said axis of said elongate member.

5. A manipulator as in claim 1, wherein said flexure members converge toward said axis of said elongate means in the direction toward the end thereof connected to said support means.

6. An object manipulator for selectively positioning an object, comprising:
base means;
object support means for supporting the object to be positioned;
elongate flexible main body means connected adjacent one end thereof to said base means and adjacent its opposite end to said support means for undergoing selected multidirectional bending and twisting movements effective to vary the position of said support means relative to said base;
said elongate body means having a longitudinal axis and including resilient flexure members spaced about said axis and having respective longitudinal axes extending in generally parallel relationship to said axis of said elongate body means; and
drive means connected to said flexure members for imparting thereto motions causing said multidirectional bending and twisting movements of said elongate body means, said drive means including means for selectively rotating said flexure members about the respective longitudinal axes thereof.

7. A manipulator as in claim 6, wherein said drive means includes means for imparting axial movements to said flexure members.

8. A manipulator as in claim 6, wherein said flexure members are resiliently flexible along substantially their entire lengths.

9. A manipulator as in claim 6, wherein said flexure members each include substantially rigid sections, and resilient elastomeric joint means interconnecting said sections for permitting bending of said members while resiliently biasing said sections thereof toward preselected positions relative to each other.

10. An object manipulator for selectively positioning an object, comprising:
base means;
object support means for supporting the object to be positioned;
elongate flexible main body means connected adjacent one end thereof to said base means and adjacent its opposite end to said support means for undergoing selected multidirectional bending and twisting movements effective to vary the position of said support means relative to said base;
said elongate body means having a longitudinal axis and including resilient flexure members spaced about said axis and extending in generally parallel relationship thereto, said object support means including a support member having first and second sections interconnected for pivotal movement relative to each other and rotative movement with each other in response to axial movement of said flexure members; and
drive means connected to said flexure members for imparting thereto motions causing said multidirectional bending and twisting movements of said elongate body means.

11. A manipulator as in claim 10, wherein said support member includes shaft means interconnecting said sections thereof for said relative pivotal movement, and wherein at least one of said flexure members is connected to one of said sections of said support member and at least a second one of said flexure members is connected to the other of said support member sections.

12. A manipulator as in claim 10, wherein said object support means further includes a second support member, and means mounting said second support member in a substantially stable orientation upon said first mentioned support member for rotative movement in unison with said first support member.

13. An object manipulator for selectively positioning an object, comprising:
base means;
object support means for supporting the object to be positioned;
elongate flexible main body means connected adjacent one end thereof to said base means and adjacent its opposite end to said support means for undergoing selected multidirectional bending and twisting movements effective to vary the position of said support means relative to said base;
said elongate body means having a longitudinal axis and including resilient flexure members spaced about said axis and extending in generally parallel relationship thereto; and
drive means connected to said flexure members for imparting thereto motions causing said multidirectional bending and twisting movements of said elongate body means, said drive means being located and connected to said flexure members adjacent said base means, said drive means including piston and cylinder assembly and means for rotating said assembly about its longitudinal axis.

14. A manipulator as in claim 13, wherein said drive means includes a plurality of piston and cylinder assemblies drivably connected to respective ones of said flexure members.

15. A manipulator as in claim 14, including means mounting the cylinder component of each of said assemblies for rotative movement about the longitudinal axis of said assembly, said drive means further including means for imparting rotative movement to said cylinder component of each of said assemblies.

16. An object manipulator for use as a robot arm or the like, comprising:
base means;
object support means for supporting an object to be positioned;
elongate flexible main body means connected adjacent one end thereof to said base means and adjacent its opposite end to said support means, for undergoing controlled multidirectional movements, effective to vary the position of said support means relative to said base means, of any desired type in the group consisting of the extension, retraction, bending and twisting types;

said main body means having a longitudinal axis and including at least three elongate resilient flexure members spaced equally from each other about said axis and extending in generally parallel relationship thereto, said main body undergoing translatory movement generally parallel to said axis during said extension and retraction thereof;

said flexure members being rods adapted for and capable of transmission of axial compressive-type loads of substantial magnitude applied thereto during use of the manipulator, and having first end portions adjacent said base means;

drive means carried by said base means and operatively connected to said first end portions of said flexure members for, when actuated, imparting to said flexure members selected motions causing movement of said main body elongate means of any desired one of said types.

17. An object manipulator for use as a robot arm or the like, comprising:
base means;
object support means;
elongate means extending between and interconnecting said base and support means, said elongate means having a central axis and including a plurality of elongate resilient flexure members spaced from each other about said axis and extending in generally parallel relationship thereto;

drive means connected to said flexure members for axially moving some of said members relative to other of said members;

reacting means associated with said support means for so reacting to forces applied thereto by said relative axial movment of said flexure members as to produce a moment causing rotation of said support means and twisting of said elongate means about said axis of said elongate means, said reacting means including a support member having first and second sections, and pivot means pivotally interconnecting said sections for pivotal movement thereof in opposite directions relative to each other.

18. A manipulator as in claim 17, and further including resilient flexible means interconnecting said flexure members intermediate the length thereof for assisting in maintaining said members in said substantially parallel relationship.

* * * * *